United States Patent [19]

Black

[11] Patent Number: 4,506,839

[45] Date of Patent: Mar. 26, 1985

[54] FORAGE HARVESTER SHEAR BAR WITH CONCAVE CUTTING SURFACE

[75] Inventor: Robert D. Black, Ottumwa, Iowa

[73] Assignee: Deere & Company, Moline, Ill.

[21] Appl. No.: 376,082

[22] Filed: May 7, 1982

[51] Int. Cl.³ .............................................. B02C 18/18
[52] U.S. Cl. .................. 241/101.7; 241/222; 241/241
[58] Field of Search ............... 241/222, 223, 224, 237, 241/239, 240, 241, 242, 243, 291, 101.7, 286

[56] References Cited

U.S. PATENT DOCUMENTS 2,870,967  1/1959  Huelden .............................. 241/222
4,190,209  2/1980  DeBuhr et al. .................. 241/241 X
4,298,170  11/1981 Snavely ............................... 241/222

Primary Examiner—Mark Rosenbaum

[57] ABSTRACT

A forage harvester shear bar having a first surface across which crop material is fed for cutting by the harvester cutterhead. A cutting surface perpendicular to the first surface forms a cutting edge therewith. The shear bar is arched upwardly by clamping against an arched support to provide enhanced rigidity and strength. The cutting surface is formed with a concavity therein, prior to being worn by usage in the forage harvester, to provide enhanced ability to achieve optimum, uniform clearance from the cutterhead. The concavity in the cutting surface provides compensation for the arch formed in the shear bar.

2 Claims, 3 Drawing Figures

FORAGE HARVESTER SHEAR BAR WITH CONCAVE CUTTING SURFACE

BACKGROUND OF THE INVENTION

This invention relates to forage harvesters and more particularly relates to a shear bar for use with a rotary cutterhead.

Forage harvesters for removing crop material from the field, reducing the crop material in size and discharging the reduced crop into a collector vehicle are well known. Most currently marketed forage harvesters utilize a cylinder or reel type cutterhead and a stationary shear bar for cutting. Crop material is fed across the upper surface of the shear bar toward the rotating cutterhead which chops the crop into small particles. A cutterhead of this type is disclosed in the U.S. Pat. No. 4,061,284.

The shear bar is generally fastened to a strong support structure to insure that the shear bar can withstand the forces encountered during the cutting operation. To eliminate vibration and failure of the shear bar and/or its support, it is important to maintain contact between the shear bar and its support along the entire length of the shear bar. One known method (see. e.g., U.S. Pat. No. 3,342,231) for maintaining such contact is to use a support structure with a curved or crowned upper surface and rectangular shear bar with planar sidewalls. The shear bar is mounted by bending it over the curved support surface into an arched shape thereby providing good contact over the entire length of the shear bar. The arched upper surface is perpendicular to the shear bar surface across which crop material is fed for cutting. However, it has been found when using an arched shear bar that the clearance between the shear bar and cylinder circumscribed by the cutterhead varies sufficiently to reduce the uniformity of cut and frequently the harvester cutting efficiency. Both harvester efficiency and uniformity of cut are important design criteria for forage harvesters.

SUMMARY OF THE INVENTION

Accordingly, it is an object of this invention to provide an improved forage harvester which has a shear bar which is mounted on a support providing a rigid, vibration free mounting and at the same time is shaped to permit the adjustment of the shear bar at a uniform, precise clearance from the cutterhead thereby improving harvester cutting efficiency and uniformity of cut.

These and other objects of the invention are accomplished by a forage harvester comprising a cutterhead rotatable about an axis, having knives supported thereon, and generating a cylinder when rotated about the rotational axis and a shear bar arched such that the upper surface across which crop material is fed is convex and having a cutting surface generally perpendicular to the upper surface. In accordance with the features of this invention, the cutting surface is initially concave toward the cutterhead in a direction parallel to the upper surface prior to being worn by usage in the harvester. The use of an arched shear bar with a concave cutting surface permits the shear bar to be simultaneously rigidly mounted at a uniform clearance from the cutterhead.

In accordance with another feature of the invention, the shear bar has a second cutting surface opposed to and spaced from the first cutting surface. The second cutting surface is also initially concave away from the first cutting surface prior to being worn by usage in the harvester. The provision of a second cutting surface enables the shear bar to be alternately mounted with the second cutting surface concave toward the cutterhead after the first cutting surface has become worn and is no longer usable. Both longitudinal edges of each cutting surface are also alternately usable as the cutting edge cooperative with the knife edges of the cutterhead.

The invention may also be embodied in a method for manufacture of a shear bar wherein a concavity is formed in a cutting surface of the shear bar perpendicular to the upper surface of the shear bar. The plane of the concavity is parallel to the plane of the upper surface. Preferably after the formation of the concavity, a hardfacing is applied to the cutting surface.

DESCRIPTION OF THE PREFERRED EMBODIMENT

Figure 1:
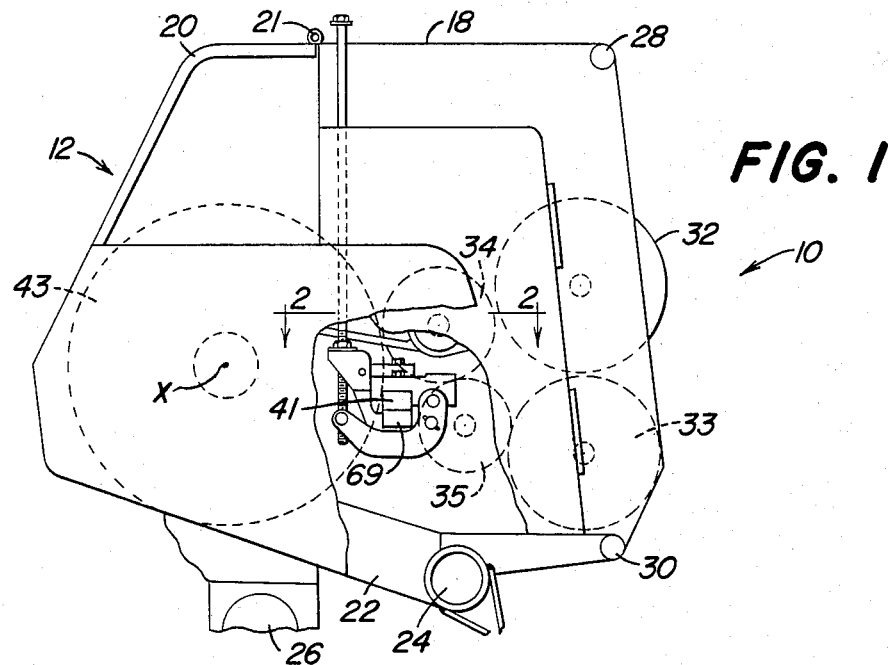
FIG. 1 is a fragmentary side elevational view of a forage harvester embodying the invention herein and showing particularly the cutterhead housing with portions of the shielding broken away to show the shear bar.
Figure 2:
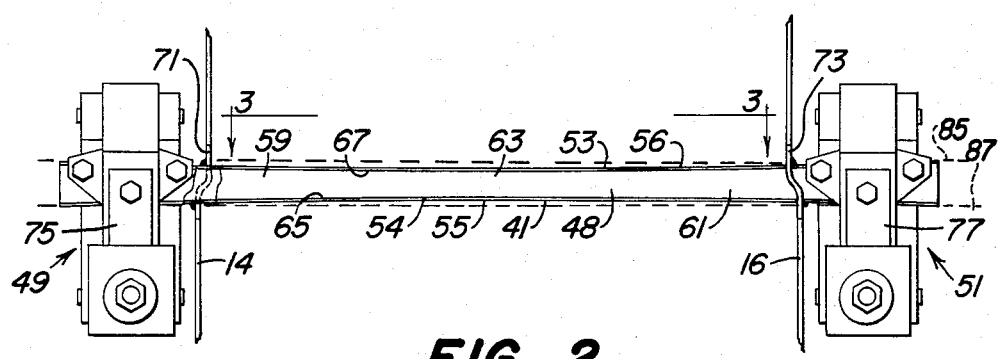
FIG. 2 is a plan view of the shear bar and adjusting mechanism as viewed along line 2—2 of FIG. 1.

Reference is now made to FIGS. 1 and 2 which illustrates the invention embodied in a pull type forage harvester having a mobile main frame 10, only the right rear portion of the harvester being illustrated. As is well known, such pull type harvesters have a generally L-shaped frame. The forward end of the fore and aft of the frame includes a tongue that is attached to a tractor. The frame is support for movement along the ground on a pair of wheels disposed at opposite ends of the rearward transverse portion of the frame. As is also conventional, a cutterhead housing 12 is mounted on the outer end of the rearward transverse portion of the frame outboard of the towing tractor. The cutterhead housing includes opposite upright left and right sidewalls 14, 16 respectively, and a generally horizontal top wall 18 extending between opposite sidewalls 14, 16. At the rearward end of the top wall 18 is an upper door 20 spanning the width of the cutterhead housing 12. Upper door 20 is mounted on a transverse hinge 21 which allows door 20 to be swung upwardly to provide access to the interior of housing 12 from the top and rear. Housing 12 also includes a pair of fore and aft, channel-like frame members 22 along the lower portions of sidewalls 14, 16 and a tubular transverse frame member 24 interconnecting frame members 22 between the lower front portion of the sidewalls. Main frame 10 also includes an axle structure 26, generally below housing 12. The right and left wheels are mounted respectively on the axle structure outwardly of and adjacent to the left and right sidewalls 14, 16.

A pair of transversely aligned, upper attachment ears 28 (only the right ear being shown) extend outwardly from opposite sidewalls 14, 16 at the upper front corner thereof. A similar pair of transversely aligned lower attachment ears 30 (only the right ear being shown) project outwardly from opposite sidewalls 14, 16 adjacent to lower forward ends thereof. Various types of harvesting headers are removably mounted on attachment ears 28, 30 and are operative to remove crop material from the field and deliver it rearwardly to the open forward end of the cutterhead housing 12. Upper and lower front feed rolls 32, 33 respectively, are journaled in and extend between left and right sidewalls 14, 16 at the forward end of housing 12. Upper and lower rear feed rolls 34, 35 respectively, similarly extend between opposite sidewalls 14, 16. As is well known, the lower feed rolls 33, 35 are adjacent to one another and are axially fixed. The upper feed rolls 32, 34 are rotatably supported in a mechanism that permits vertical adjustment of the feed rolls 32, 34 to vary the clearance between the respective upper and lower feed rolls according to the thickness of the mat of crop material being fed rearwardly between the two sets of feed rolls. Upper feed rolls 32, 34 rotate in a clockwise direction and viewed in FIG. 1 and lower feed rolls 33, 35 rotate in a counterclockwise direction.

Feed rolls 32-35 deliver crop rearwardly over an upper surface 48 of a transverse shear bar 41 that spans the width of the cutterhead housing 12 immediately to the rear of lower feed roll 35. Cutterhead 43 is rotatably mounted in housing 12 about axis a horizontal transverse axis and extends between opposite sidewalls 14, 16. Only the outer periphery of cutterhead 43 is illustrated in FIG. 1 in dotted lines. A preferred cutterhead is disclosed in U.S. Pat. No. 4,061,284, and will not be described in detail herein as the cutterhead forms no part of the invention herein. Cutterhead 43, when rotated about axis X, generates a cylinder with the knife cutting edges at the cutterhead periphery. Cutterhead housing 12 further includes a mechanism (not shown) for sharpening the cutterhead knife edges. A preferred knife sharpener is disclosed in U.S. Pat. No. 4,189,875. A description of the sharpening mechanism has been omitted herein as it forms no part of the invention.

Shear bar 41 is supported on cutterhead housing 12 to adjustment toward and away from the cutterhead periphery below a horizontal plane through the axis X to control the clearance between the cutterhead knives and shear bar 41 in a pair of shear bar mounting and adjustment mechanisms 49, 51 connecting the opposite ends of shear bar 41 to opposite sidewalls 14, 16. A preferred embodiment of adjustment mechanism 49, 51 is disclosed in U.S. Pat. No. 4,190,209. A detailed description of the adjusting mechanism 49, 51 is omitted herein as it forms no part of the invention.

Figure 3:
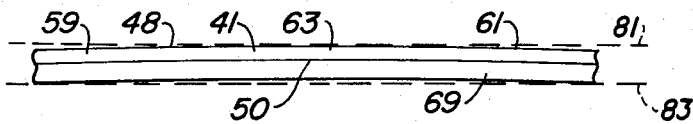
FIG. 3 is a fragmentary, side elevational view of the shear bar and support taken along line 3—3 of FIG. 2.

As shown in FIGS. 2 and 3 herein, shear bar 41 includes the upper surface 48, across which crop material is fed for chopping. For enhanced strength and rigidity, upper surface 48 is arched upward in a direction perpendicular to the flow of crop material. A first cutting surface 53 and a second, (alternate) cutting surface 55 intersect with upper surface 48. A cutting edge 54 is formed by the intersection of upper surface 48 and the cutting surface 53. An alternate cutting edge 56 is formed by the intersection of surfaces 48, 55. Also, as is well known, a lower surface 50 may be mounted as the upper shear bar surface across which crop is fed for cutting. In this case, the longitudinal edges formed by the intersections cutting surfaces 53 and 55 with the surface 50 are alternately usable as the cutting edges cooperative with the cutterhead.

Shear bar 41 further includes relatively thin layers 65, 67 of a high wear resistant hard facing alloy, such as tungsten carbide, for example, applied in a conventional manner to form cutting surfaces 53, 55, respectively. A preferred process for the application of the tungsten carbide layer is (1) to apply a thin layer of powdered tungsten carbide to the surfaces which are to form cutting surfaces 53, 55 and (2) to heat the shear bar and powder to fuse the tungsten carbide to the shear bar 41. The concavity is machined in the surfaces prior to the application of the tungsten carbide. It will be recognized that the concavity could be formed also after application of the tungsten carbide. The thickness of the hard facing layers 65, 67 is preferably in the range of about 0.01 cm to 0.03 cm. The application of a hard facing material to the cutting surfaces of a shear bar for the purposes of this invention is carried out preferably in accordance with in U.S. Pat. No. 3,635,271, the disclosure of which is hereby incorporated by reference herein. The application of a hard facing to the cutting surface of a shear bar, per se, forms no part of the invention herein.

As shown in FIG. 3, shear bar 41 is supported on support 69 which provides enhanced strength and rigidity for shear bar 41. Support 69, essentially an elongated steel bar having a rectangular cross section, extends between opposite sides 14, 16 of the cutterhead housing 12 and underlies shear bar 41. The opposite ends of both shear bar 41 and support 69 extend through openings 71, 73 in sidewalls 14, 16, respectively. Openings 71,73 are large enough to accommodate fore and aft adjustment of the shear bar on support 69. At least a portion of the edge of the openings 71, 73 is adjacent to support 69 to permit welding of sidewalls 14, 16 to support 69.

Support 69 is formed in the shape of an arch and is oriented with the arch extending generally vertical towards the horizontal plane through the axis X. Shear bar 41 is initially formed with planar upper and lower surfaces 48, 50. To further enhance the durability, strength and rigidity of the shear bar, the shear bar 41 is clamped across the support 69 to assume the arched configuration of support 69 by a pair of clamps 75, 77 of adjustment mechanisms 49, 51. To better illustrate the arched configuration of shear bar 41 and support 69 in FIG. 3, a pair of parallel dotted lines 81, 83 are shown adjacent surfaces 48, 50, respectively.

In accordance with the features of this invention, cutting surface 53 is initially concave toward said cutterhead prior to being worn by usage of the harvester to chop crop material. It is known that as the shear bar 41 wears the usage, that the cutting surface tends to become concave toward the cutterhead 43. Alternate cutting surface 55 is also initially concave prior to being worn by usage in a harvester. To better illustrate the concave shape of surfaces 53, 55 in FIG. 2, a pair of parallel dotted lines 85, 87 are shown adjacent surfaces 53, 55, respectively. Opposed surfaces 53, 55 are used alternately as the cutting surface against which crop material is cut by cutterhead 43. That is, when the cutting surface 53 is worn so as to be further unusable, the shear bar 41 is removed from the machine and reinstalled so that the surface 55 lies adjacent to cutterhead 43.

It has been found that the formation of a concavity in each of the cutting surfaces 53, 55 of shear bar 41 provides improved uniformity of the clearance between the peripheral of the cutterhead 43 and shear bar 41. This may be understood by noting that if the cutting surface 53 were planar and the bar 41 mounted with upper surface 48 convex upwardly, the clearance between the periphery of the cutterhead 43 and cutting edge 54 has a slight variation along the length of the shear bar. Edge 54 is farther away from the cutterhead periphery at its respective ends 59, 61 than at the mid point 63 of edge 54. By the formation of the concavity in surface 53 the greater vertical height of the central portion 63 of edge 54 is compensated for by being recessed inwardly away from the cutterhead 43. Thus, it can be seen by properly choosing the dimensions of the concavity formed in surfaces 53, 55, the variation in clearance which would otherwise occur due to the convex shape of upper surface 48 may be offset or compensated for throughout the length of shear bar 41. As a result, a more uniform clearance between the cutterhead and shear bar maybe achieved along the entire length of shear bar 41. With improved uniformity of clearance, it will be recognized that greater cutting energy efficiency and uniformity of crop cutting may be achieved.

In accordance with the method of manufacture of a shear bar 41, an elongated bar of steel having a rectangular cross section is formed. All surfaces of the shear bar are initially planar. In accordance with the improved method of this invention, each cutting surface 53, 55 is machined to form a concavity therein extending in a direction generally parallel to the surface 48 across which crop material is fed for cutting by the cutterhead 43. Then, in accordance with a conventional process, a powdered layer of tungsten carbide is applied to the surfaces 53, 55 and fused thereon. As explained above, the hard facing maybe applied prior to forming the concavities.

It will be appreciated by those skilled in the art that the practice of this invention achieves a shear bar having strength and rigidity to better withstand the cutting forces encountered in chopping of crop material. At the same time, the shear bar may be accurately adjusted relative to the periphery of the cutterhead 43. Thus, it can be appreciated that the enhanced accuracy of clearance permitted by the formation of a concavity in each cutting surface 53, 55 will reduce the amount of energy required to shear crop material moving across the shear bar and will improve uniformity of crop cutting.

It will be appreciated by those skilled in the art that the invention has been described in connection with certain preferred embodiments thereof. It will be apparent that other modifications and embodiments of the invention are possible. Accordingly, it is intended that all such modifications and embodiments are comprehended within the scope of the appended claims.

I claim:

1. In a harvester including a cutter head mounted for rotation about a horizontal transverse axis and including a plurality of cutting edges located for generating a cylinder when rotated about said axis, a transverse shear bar mounted adjacent to said cylinder at a location below a horizontal plane passing through the axis and being supported along its entire length in an arched condition wherein an upper surface thereof has a center located closer to said plane than are opposite ends, and a hard-faced cutting surface extending lengthwise of said cutter head and intersecting with said upper surface to form a shear bar cutting edge, the improvement comprising: said cutting surface being concave toward the cutter head and being perpendicular to said upper surface prior to being worn by usage in the harvester; and said shear bar cutting edge being spaced equally throughout its length from said cylinder.

2. The harvester of claim 1 wherein said bar has a second cutting surface opposed to and spaced from said first cutting surface, said second cutting surface being initially concave away from said first cutting surface prior to being worn by usage in the harvester.

* * * * *